US012635050B2

(12) United States Patent
Chen

(10) Patent No.: US 12,635,050 B2
(45) Date of Patent: May 19, 2026

(54) METHOD AND DEVICE FOR PROVIDING A WIDE RANGE OF UNIFORM UVB LIGHT SOURCES

(71) Applicant: Dong Guan ETAN Pet Supplies Co., Ltd, Dongguan (CN)

(72) Inventor: Hongqi Chen, Dongguan (CN)

(73) Assignee: Dong Guan ETAN Pet Supplies Co., Ltd, Dongguan (CN)

( * ) Notice: Subject to any disclaimer, the term of this patent is extended or adjusted under 35 U.S.C. 154(b) by 187 days.

(21) Appl. No.: 18/757,759

(22) Filed: Jun. 28, 2024

(65) Prior Publication Data

US 2025/0106964 A1 Mar. 27, 2025

(30) Foreign Application Priority Data

Sep. 25, 2023 (CN) ......................... 202311237439.1

(51) Int. Cl.
*H05B 45/325* (2020.01)
*H05B 45/12* (2020.01)
*H05B 45/22* (2020.01)

(52) U.S. Cl.
CPC ........... *H05B 45/325* (2020.01); *H05B 45/12* (2020.01); *H05B 45/22* (2020.01)

(58) Field of Classification Search
CPC ....... H05B 45/325; H05B 45/12; H05B 45/22
See application file for complete search history.

(56) References Cited

U.S. PATENT DOCUMENTS

2015/0373791 A1* 12/2015 Moore ................. H05B 45/375 315/297
2015/0373804 A1* 12/2015 Moore ................... H05B 45/44 315/297
2016/0375163 A1* 12/2016 Hawkins ................... F21V 5/04 422/22
2019/0098725 A1* 3/2019 Sadwick ................ H05B 45/20
2020/0161510 A1* 5/2020 Jung ........................ A61L 2/084
2020/0212265 A1* 7/2020 Bae ..................... H01L 25/0753

FOREIGN PATENT DOCUMENTS

CN 205828348 U 12/2016
CN 218006565 U * 12/2022
KR 102058487 B1 * 2/2020 ............. H05B 47/10

* cited by examiner

*Primary Examiner* — Abdullah A Riyami
*Assistant Examiner* — Syed M Kaiser
(74) *Attorney, Agent, or Firm* — JEEN IP LAW, LLC

(57) ABSTRACT

A method for providing a wide range of uniform UVB light sources and a device thereof, which are used to ensure the uniform superimposed UVB irradiance in a lamp equipped with multiple UVB lamp beads. The method comprises the following steps: selecting the angle of a UVB lens and appropriate band and light power and optical power, adjusting the distance between UVB lamp beads to ensure that the irradiance of UVB lamp beads is superimposed to a target range, and fine-tuning each lamp bead; setting up a PWM constant current control circuit with a corresponding number of channels according to the number of UVB to subdivide and digitize the irradiance, and obtain an accurate value to correspond to the corresponding UVB value; using a UVB irradiance meter for real-time measurement; and calibrating the irradiance to the target UVB irradiance following a calibration program.

10 Claims, 9 Drawing Sheets

METHOD AND DEVICE FOR PROVIDING A WIDE RANGE OF UNIFORM UVB LIGHT SOURCES

CROSS-REFERENCE TO RELATED APPLICATIONS

This application claims priority to Chinese Patent Application No. 202311237439.1, filed on Sep. 25, 2023, which is hereby incorporated by reference in its entirety.

TECHNICAL FIELD

The present invention relates to LED UVB light source technology, in particular to a method for providing a wide range of uniform UVB light sources.

BACKGROUND

LED light sources have developed diversely, including UVB light source technology. This technology is widely used, for example, to provide a wide range of uniform UVB light sources for crawling pets in feeding areas or feeding devices.

Commercially available UVB light source fluorescent lamps work by applying a powder on the inner surface of a long-strip high borosilicate glass tube, which emits light under excitation by a ballast. Different formulas and spraying ratios produce varying irradiances, leading to various UVB lamp tube products on the market, including UVB2.0, UVB5.0, UVB10.0 and UVB15.0. The common advantage is that UVB is relatively uniform, depending on the uniformity of the powder applied on the inner surface. For example, a directional ultraviolet UVB lamp tube for pet feeding disclosed in No. CN205828348U (authorization announcement No.) Chinese patent is one of the above-mentioned UVB lamp tube products. The lamp tube comprises a straight luminescent tube with a local fluorescent layer, and the straight tube is coated with fluorescent powder outside, which achieves precise irradiation by controlling the luminescence area and irradiation angle of the lamp tube through horizontal uncoated fluorescent powder. However, at present, these lamp tubes experience relatively rapid light attenuation due to luminescence upon long-term excitation. Generally, both ends of the lamp tubes blacken after three months, reducing UVB irradiance to less than 30% of the original.

In addition to the UVB lamp tubes, LED UVB lamp beads are also available on the market, which emit light directly under the action of voltage through semiconductor chips, offering increased lifespan of the UVB light source and lower attenuation. The attenuation is less than 50% after one year. However, there are also some limitations as follows:

First, the extremely small size of the LED semiconductor chip of the lamp bead results in a strong central point light source with weaker surrounding areas. Therefore, the general practice is to add an optical lens to the LED UVB lamp bead encapsulated to diffuse the light evenly. However, no matter how it diffuses, due to the small size of the lamp bead, the same problem still exits, with the middle part being high and the edges low; at the same time, in view of the differences between individual chips, the wavelength and light power of the emitted UV light are different in procedures, leading to obvious differences in the irradiance vertically below. This is particularly prominent when used in applications. The reason is that: considering the process of feeding pets, it is impossible to only provide a small part of UVB light for the local area, but to provide this light in most of the entire breeding box, so that pets can better absorb calcium and grow healthily under the support of UVB. Obviously, given the inherently limited range of such point light sources, to expand the coverage area, it is necessary to increase the number of point light sources. However, due to the differences in lamp bead chips, the stronger ones become stronger while the weaker ones become weaker in the superposition process, further deteriorating the uniformity of UVB over a large area.

Second, according to the analysis on the advantages and disadvantages of the existing UVB lamp tube and UVB lamp bead above, in order to obtain a large-area uniform UVB, the superposition of multiple point light sources is the only choice, which can be simulated by software in the optical field. However, the premise requirement is very little difference between single lamp beads, and at least the amplitude of each lamp bead must be the same. However, for the industry of producing LED UVB lamp beads, the requirements are too high, the molding yield is too low, and the mass production is infeasible; if the hardware circuit is used for realization, it is necessary to test the irradiance of each lamp bead, and adjust the current or voltage at both ends according to the irradiance specification requirements to be met by the optical simulation superposition effect. How to make adjustment and how much to make adjustment is a technical problem, so it cannot be achieved in terms of hardware.

Based on the above analysis, the present invention provides a method for providing a wide range of uniform UVB light sources in combination with practical application requirements, aiming at ensuring that each lamp bead emits same uniform irradiance and that the superimposed UVB irradiance is relatively uniform within a lamp equipped with multiple UVB lamp beads.

SUMMARY

As for the above defects, the present invention provides a method for providing a wide range of uniform UVB light sources, aiming at ensuring that each lamp bead emits same uniform irradiance and the superimposed UVB irradiance is relatively uniform within a lamp equipped with multiple UVB lamp beads through corresponding operation steps.

To achieve the above aim, the present invention adopts the following technical solution:

A method for providing a wide range of uniform UVB light sources, which is used to make the superimposed UVB irradiance relatively uniform in a lamp equipped with multiple UVB lamp beads, comprising the following steps:

Step I: simulating a single light source using optical simulation software for a lamp equipped with multiple UVB lamp beads, selecting the angle of a UVB lens, appropriate band and optical power first, and adjusting the distance between UVB lamp beads to make the superimposed irradiance of UVB lamp beads reach a target range, and then fine-tuning each lamp bead;

Step II: adopting an adjustment device equipped with a BW-CAP touch switch and a UV-CAP touch switch, setting up a PWM constant current control circuit with a corresponding number of channels according to the number of UVB to subdivide and digitize the irradiance, and obtain an accurate value to correspond to the corresponding UVB value;

Step III: using a UVB irradiance meter to perform real-time measurement on a test rig;

Step IV: calibrating the irradiance to the target UVB irradiance following a calibration program. The method adopted involves using the touch switches to adjust the values by incrementing or decrementing; pressing and holding the two touch switches at the same time, releasing them after the red light flashes once, calibrating the value of the first UVB lamp bead at the same time, clicking the UV-CAP touch switch for value decrement and the BW-CAP touch switch for value increment, touching the two touch switches simultaneously again after calibration, calibrating the value of the second UVB lamp bead after the red indicator flashes twice, and repeating the process until all UVB lamp beads are calibrated;

Step IV: ensuring that the target UVB irradiance is achieved after calibration of all UVB lamp beads, so that the irradiation values of all lamp beads can be superimposed to obtain a uniform light source.

The above technical solution is to provide the method for providing a wide range of uniform UVB light sources, specifically for individually adjusting the emission intensity of UVB lamp beads.

The above technical solution can maintain the uniform coverage of UVB intensity within a certain range when multiple UVB beads work simultaneously.

As for the calibration program involved in above steps, the operation mode is as follows: lighting up the first UVB after starting the calibration program, using a UVB tester to test the value at a certain distance below the UVB lamp bead until it reaches the target value, then calibrating the value of the next UVB, and repeating the process until the last lamp bead is calibrated, so that each lamp bead maintains the consistent irradiance.

In step I, the data after fine tuning is stored for automatic call when the UVB work in the subsequent equipment work.

The superimposed irradiance value obtained by the above technical solution is always between a standard upper limit and a standard lower limit.

Accordingly, the skilled can select a constant current IC module, and pin ends include VIN, CSN, SW, GND and DIM.

When the above method for providing a wide range of uniform UVB light sources is implemented, the skilled also designs a corresponding device, comprising:

A SSOP20 microcontroller, wherein the 17th pin B-LED and the 15th pin W-LED are respectively connected to a blue light PWM control output module and a white light PWM control output module in sequence;

PWM constant current control circuits with several channels for subdividing and digitizing the irradiance, which are connected with the microcontroller, and each constant current control circuit includes a group of UVB light sources and a PT4115 constant current IC module;

Touch switches, comprising a BW-CAP touch switch and a UV-CAP touch switch connected with a port of the microcontroller for calibrating program operations and adjusting UVB values.

Wherein, each PWM control output module is equipped with an AO3400 transistor.

In addition, the circuit board of the microcontroller is connected to a program burning circuit module.

The method steps adopted in the present invention can ensure that each lamp bead emit the same irradiance in the lamp and the superimposed UVB irradiance is relatively uniform. Even if multiple UVB lamp beads work simultaneously, the uniform coverage of UVB intensity can be maintained within a certain range. Meanwhile, the device used is applicable to the adjustment of UAB values, so that each lamp bead maintains the consistent irradiance.

BRIEF DESCRIPTION OF DRAWINGS

The present invention is further addressed below in accordance with the Figures.

DESCRIPTION OF EMBODIMENTS

Embodiment I

As shown in FIG. 1, FIG. 5-6 and FIG. 9, the method for providing a wide range of uniform UVB light sources as proposed in the present invention, based on a reference to software and hardware design, mainly solves the problem of ensuring that each lamp bead within a lamp equipped with multiple UVB lamp beads emits the same irradiance through corresponding method steps, so that the superimposed UVB irradiance is relatively uniform. The method steps involved are as follows:

First, simulating the single light source with existing optical simulation software to obtain the most suitable distribution of lamp beads and the target UVB irradiance to be achieved. In this step, selecting the angle of the UVB lens and the appropriate band and optical power first, and then adjusting the distance between UVB lamp beads to superimpose the irradiance of the UVB lamp beads to the target range, then fine-tuning each lamp bead to achieve the target range effect, and finally storing the adjusted data through a CPU for automatic call when the UVB work in the subsequent equipment work.

Figure 5:
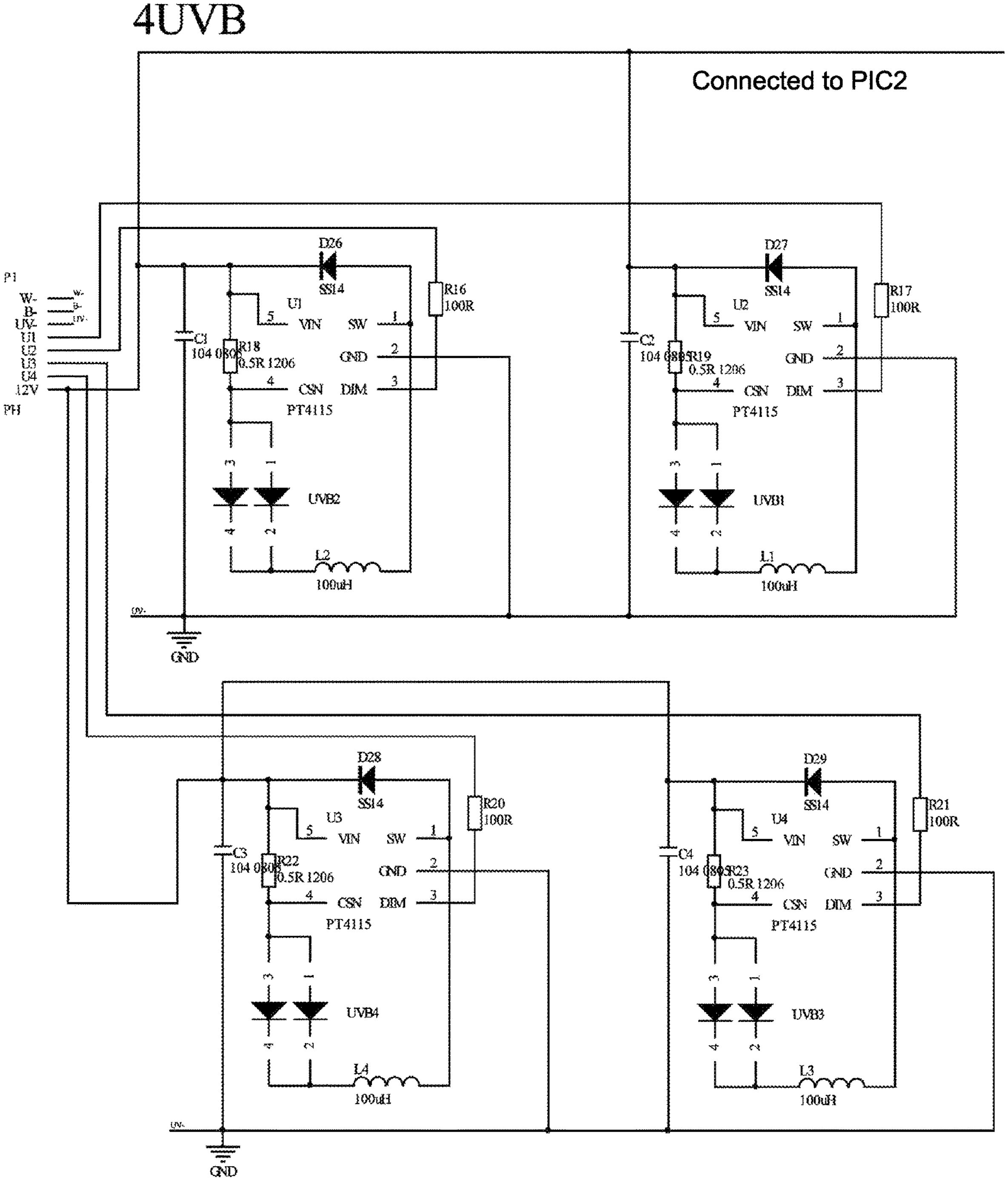
FIG. 5 is a schematic diagram I showing the PWM constant current control circuit of the device used in the method for providing a wide range of uniform UVB light sources implemented in the invention.
Figure 6:
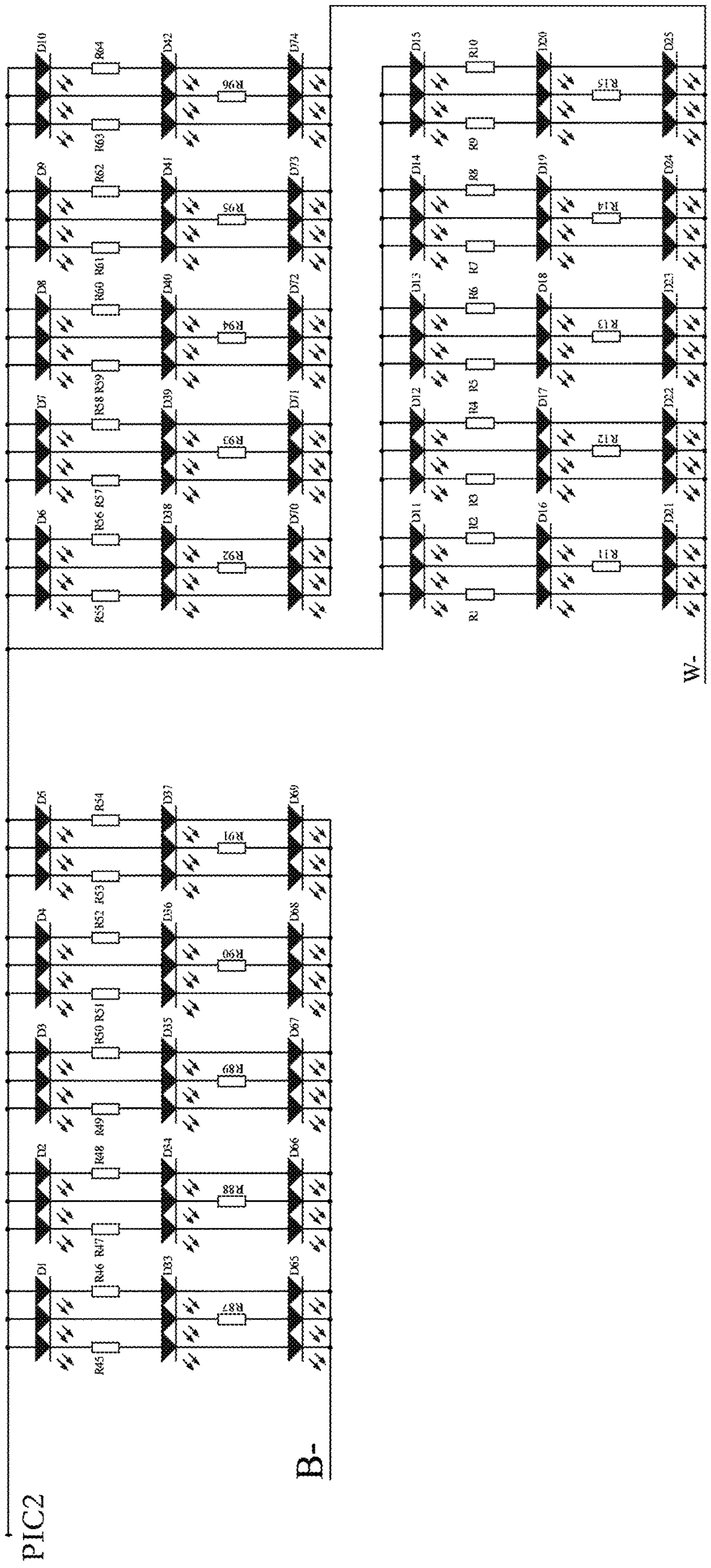
FIG. 6 is a schematic diagram II showing the PWM constant current control circuit of the device used in the method for providing a wide range of uniform UVB light sources implemented in the invention.

Second, adopting the PWM constant current control circuits with corresponding number of channels depending on the number of UVBs, and controlling the current value depending on the target UVB irradiance. The invention lists the four-channel PWM constant current control circuit. As shown in FIG. 5-6, each constant current control circuit includes a group of the UVB light sources and the PT4115 constant current IC module. The modules are U1, U2, U3 and U4 in sequence. Each group of the UVB light source lines are connected with 100 uH inductors. Wherein, pin ends of the constant current IC module include VIN, CSN, SW, GND and DIM. A 100 R resistor is connected to the pin DIM of each constant current IC module. After the PWM constant current control circuit with the corresponding number of channels is used, the irradiance is subdivide and digitized, and the CPU gives an accurate value to correspond to the corresponding UVB value. The value can be increased or decreased by touching the switches, overcoming the drawbacks of previous methods where fixed values or adjustable resistors were used to change the constant current value, which was not convenient for subsequent numerical adjustments.

Figure 9:
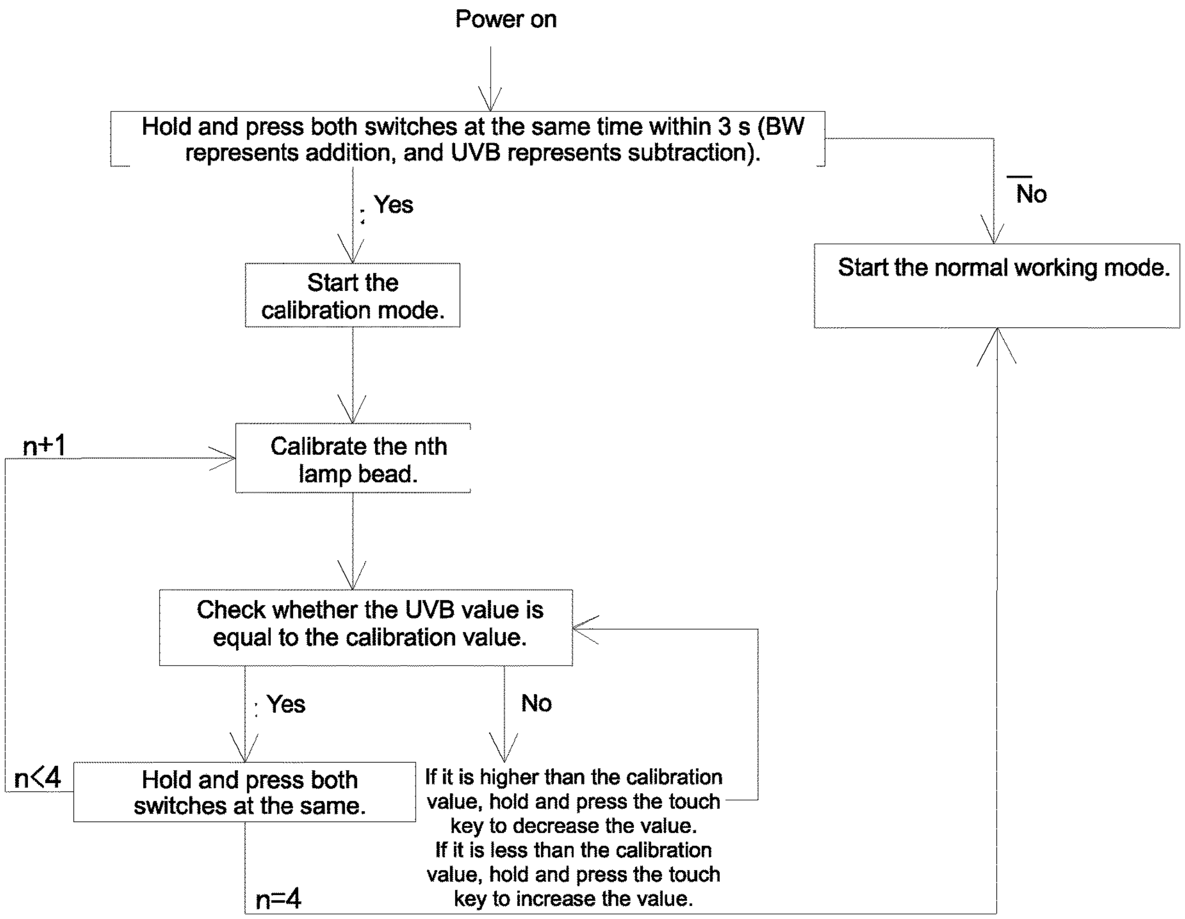
FIG. 9 is a schematic diagram showing a calibration process of the method for providing a wide range of uniform UVB light sources implemented in the invention.

Furthermore, using the UVB irradiance meter to perform real-time measurement on the test rig, calibrating the irradiance to the target UVB irradiance following the calibration program, and saving the calibrated current to the IC at this time. The specific operation method of the calibration program in this step is as shown in FIG. 9: lighting up the first UVB after starting the calibration program, testing the value 30.5 uW/cm2 below the UVB lamp bead with the UVB tester, if the target value is set to 45 uW/cm2, adjusting downwards if the value is higher and upwards if it is lower until the target value is achieved, then proceeding to calibrate the value of the next UVB lamp bead, and repeating this process until the last lamp bead is calibrated. After calibration, each lamp bead emits the consistent irradiance.

Figure 1:
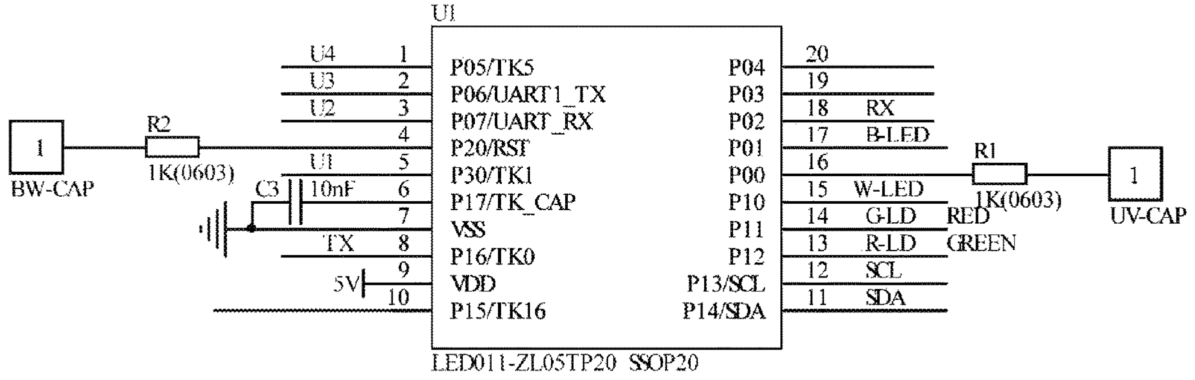
FIG. 1 is a schematic diagram showing a main control module of the device used in the method for providing a wide range of uniform UVB light sources implemented in the invention.

In this step, in the design of the calibration program, reliance can also be placed on two touch keys of the device used, as shown in FIG. 1, comprising the steps as follows: connecting the 4th and 16th pins of the main CPU to the BW-CAP and UV-CAP touch keys in sequence, pressing and holding the two touch keys at the same time (i.e., the touch switches) within 3 s after powering on the device, and releasing them after the red indicator flashes once, calibrating the value of the first UVB at the same time, clicking the UV touch key for value decrement and the switch touch key for value increment, touching the two touch keys simultaneously again after calibration, calibrating the value of the second UVB lamp bead after the red indicator flashes twice, and repeating the process until all UVB lamp beads are calibrated.

Finally, calibrating all UVB lamp beads one by one following the calibration program, and ensuring that the target UVB irradiance is achieved, so that the irradiation values of all lamp beads can be superimposed to obtain a uniform light source.

The method for providing a wide range of uniform UVB light sources as proposed in the present invention can be used for individually adjusting the emission intensity of UVB lamp beads; even if multiple UVB lamp beads work simultaneously, the uniform coverage of UVB intensity can be maintained within a certain range. In addition, the same UVB lamp bead outputs multiple UVB values (those in desert and rain) with different intensities. For example, the measured UVB value for a 100 ma power supply of UVB lamp beads is 50. If the 50 is divided into 100 parts through software, the target value shall be set to 45. Therefore, 90% of the software pmw output corresponds to a UVB value of 45.

Figure 7:
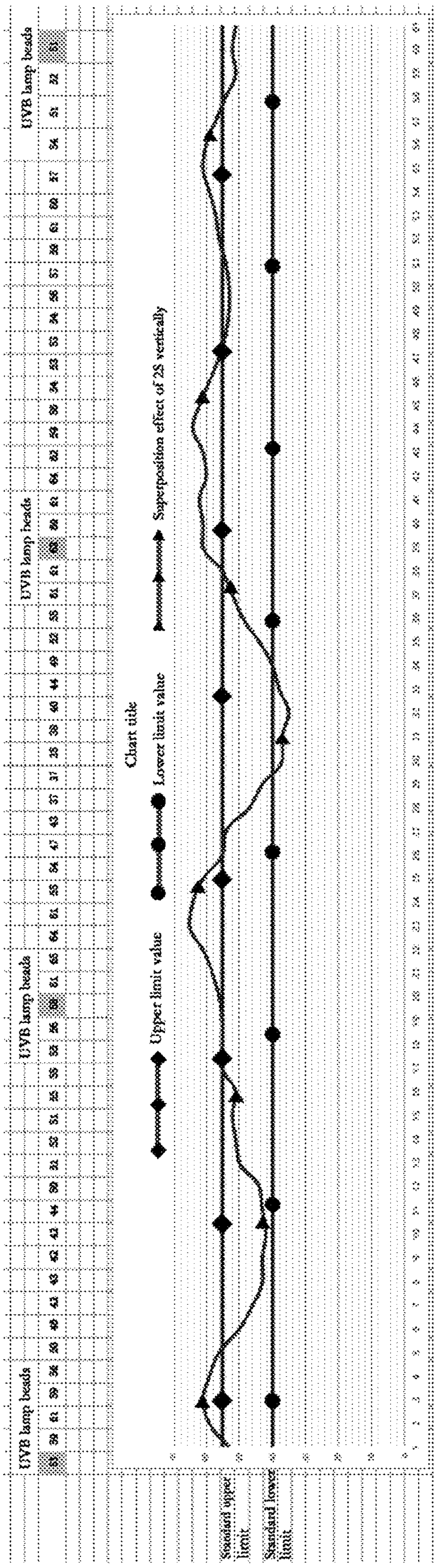
FIG. 7 is a UVB irradiance waveform before calibration.
Figure 8:
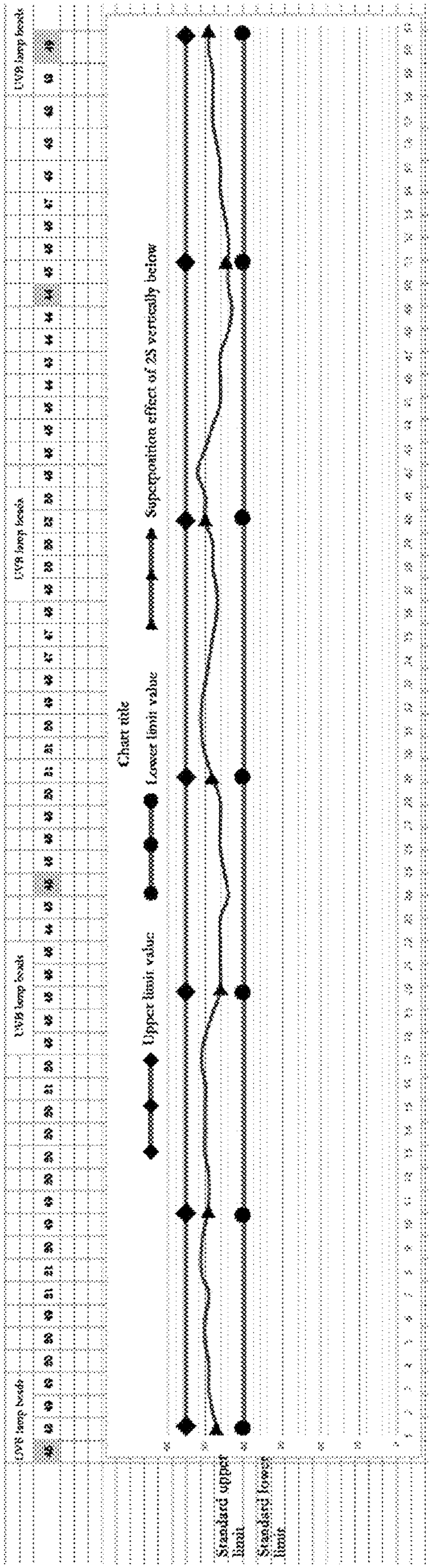
FIG. 8 is a UVB irradiance waveform after calibration of the method for providing a wide range of uniform UVB light sources implemented in the invention.

As shown in FIG. 7 and FIG. 8, the method for providing a wide range of uniform UVB light sources as proposed in the present invention has a clear comparison of the fluctuation range of UVB irradiance before and after the calibration steps. The fluctuation chart before the calibration is as shown in FIG. 7 and the fluctuation chart after the calibration is as shown in FIG. 8. Each chart has two black lines with a certain distance, which represent the "standard upper limit" and "standard lower limit" respectively. The curve between the two black lines is the superimposed irradiation value curve. Obviously, the irradiation value before the calibration in FIG. 7 is very non-uniform, and many bands exceed the "standard upper limit" and "standard lower limit"; however, after the method implemented with the technical solution in the present invention is taken, the irradiation values after the calibration in FIG. 8 are very uniform, and the trend of the irradiation value curve is always between the two standard lines, never exceeding it. Therefore, the superiority of the technical solution in the present invention is evident by comparing the experimental results before and after implementing the technical solution in the present invention.

Referring to the following embodiment for circuit modules of the device used in the method for providing a wide range of uniform UVB light sources as proposed in the present invention.

Embodiment II

Figure 2:
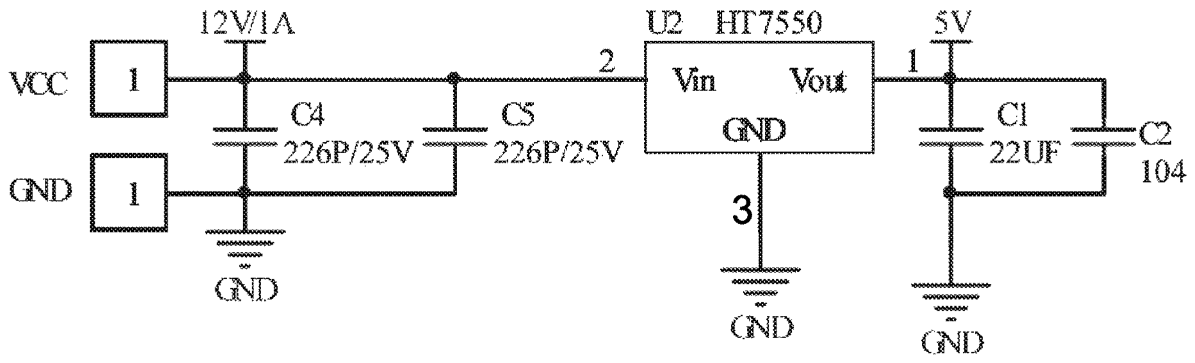
FIG. 2 is a schematic diagram showing a voltage stabilizing IC module of the device used in the method for providing a wide range of uniform UVB light sources implemented in the invention.
Figure 3:
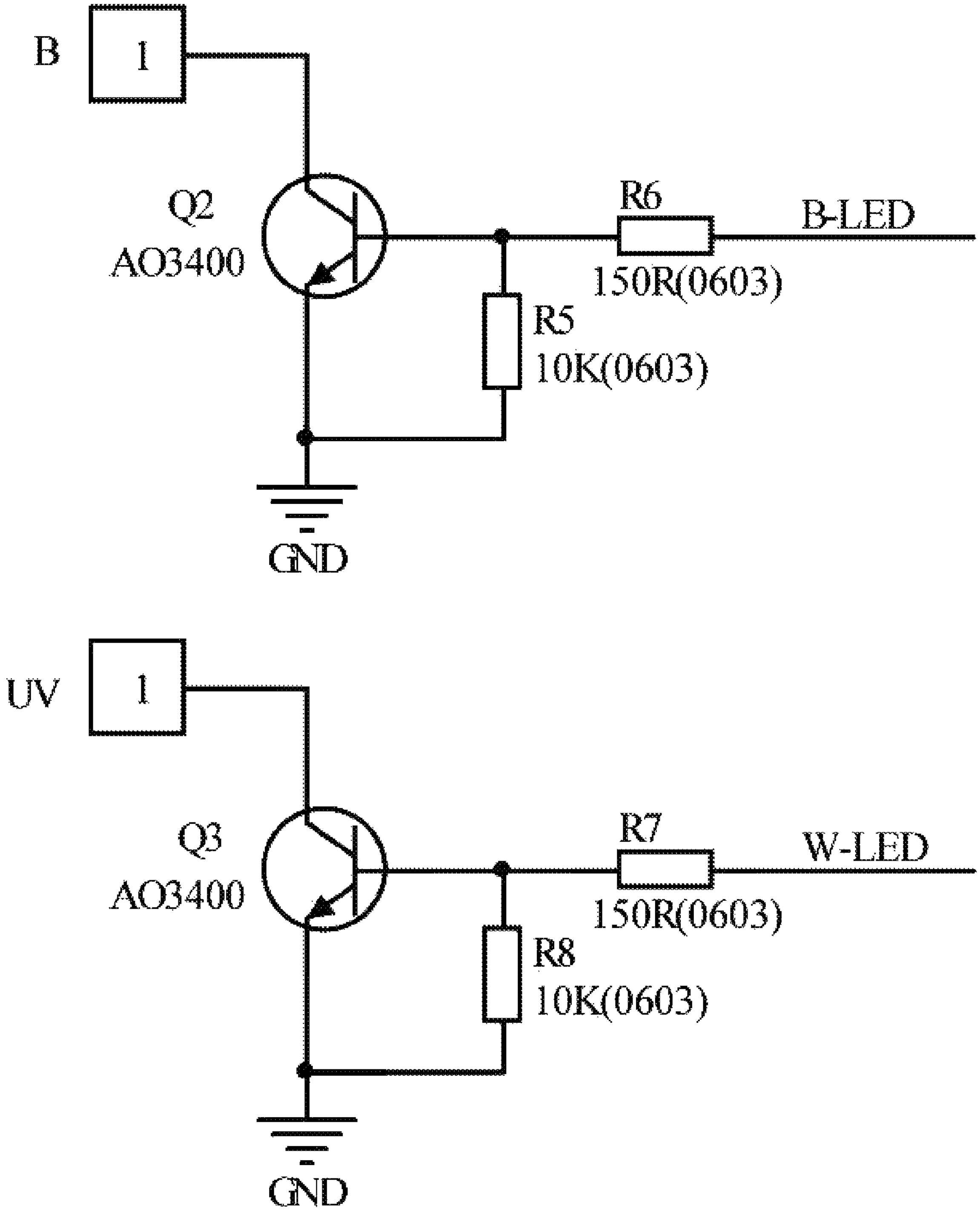
FIG. 3 is a schematic diagram showing the PWM control output module of the device used in the method for providing a wide range of uniform UVB light sources implemented in the invention.
Figure 4:
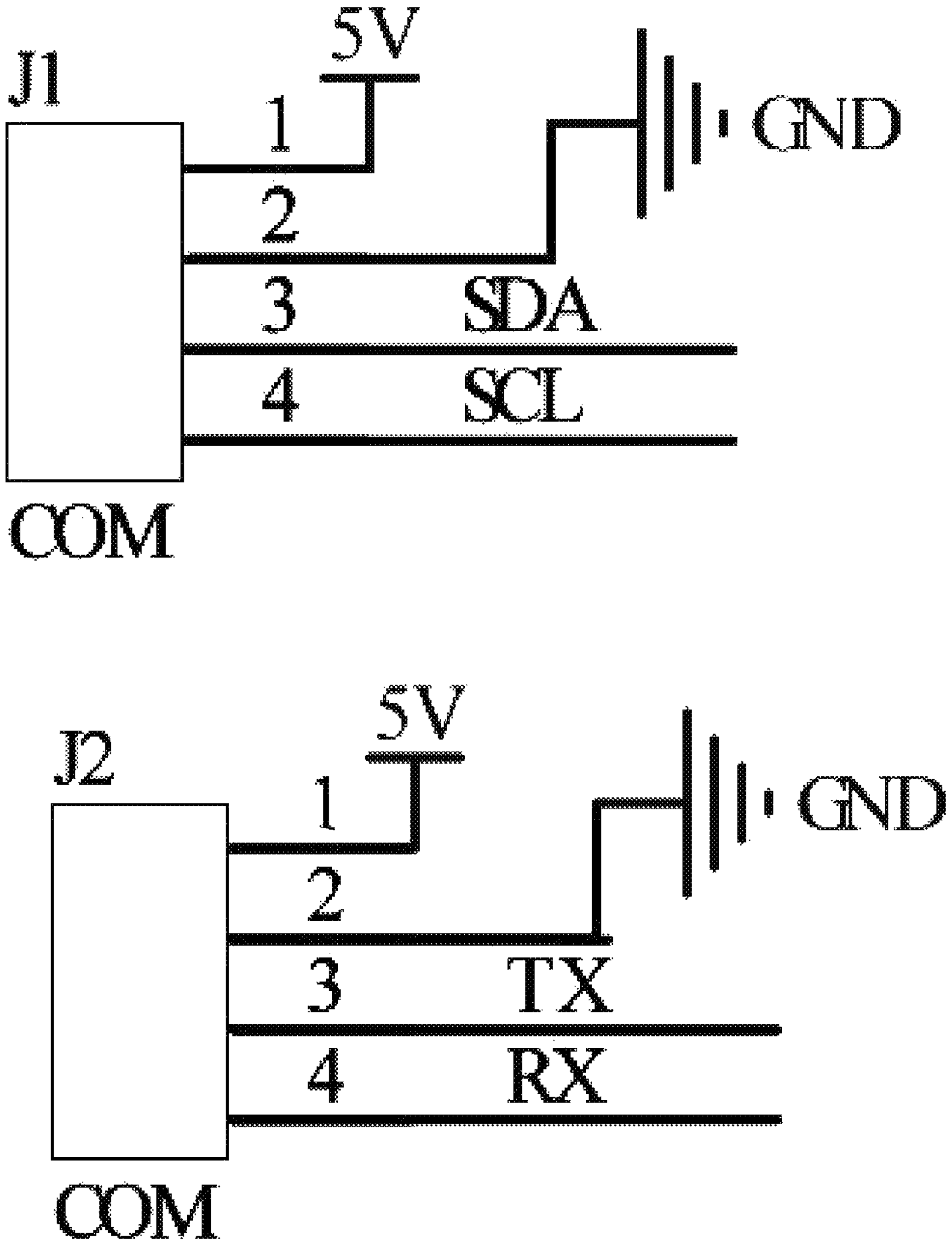
FIG. 4 is a schematic diagram showing the program burning port circuit module of the device used in the method for providing a wide range of uniform UVB light sources implemented in the invention.

As shown in FIG. 1-5, the designed device is used in the method for providing a wide range of uniform UVB light sources as proposed in the present invention, which uses the SSOP20 microcontroller U1. As shown in FIG. 1, the 17th pin B-LED and the 15th pin W-LED of the microcontroller circuit board are connected to the blue light PWM control output module and the white light PWM control output module (i.e., the two pins are connected to the B-LED end and the W-LED end in sequence as shown in FIG. 3) in sequence. Correspondingly, each control module has an AO3400 transistor shown as Q2 and Q3 in FIG. 3; at the same time, the 8th pin TX, 18th pin RX, 11th pin SDA and 12th pin SCL of the microcontroller circuit board are all connected to the program burning port, the program burning port circuit module as shown in FIG. 4; in addition, the device is also equipped with the voltage stabilizing IC module as shown in FIG. 2, in which the U2 module of HT7550 is used.

As shown in FIG. 1 and FIG. 5-6, to solve the problem of ensuring that each lamp bead emits the same irradiance in the lamp equipped with multiple UVB lamp beads, and the superimposed UVB irradiance is relatively uniform, the PWM constant current control circuit with corresponding number of channels is required, and the control current value depends on the target UVB irradiance. As shown in FIG. 1, the 5th pin U1, 3rd pin U2, 2nd pin U3 and 1st pin U4 of the microcontroller circuit board are connected to the corresponding pins of the constant current control circuit PI in sequence. Each constant current control circuit includes a group of the UVB light sources and the PT4115 constant current IC module, and the modules are U1, U2, U3 and U4 in sequence. Wherein, the pin ends of the constant current IC module include VIN, CSN, SW, GND and DIM. After the PWM constant current control circuit with corresponding number of channels is used, the irradiance is subdivided and digitized, and the CPU gives an accurate value to correspond to the corresponding UVB value. In addition, the 4th and 16th pins of the microcontroller U1 are connected to the BW-CAP and UV-CAP touch keys (i.e., the touch switches) in sequence, both the touch keys (i.e., the touch switches) are held and pressed at the same time within 3 s after the device is powered on, and the UV touch key is clicked for value decrement, and the dimming touch key is clicked for value increment.

In the description of the specification, the terms "present embodiment", "detailed description" etc. mean that the specific features, structures, materials or characteristics described in combination with the embodiment or example are included in at least one embodiment or example of the present invention or invention. In the specification, the illustrative expressions of the above terms may not refer to the same embodiment or example; moreover, the specific features, structures, materials or characteristics described can be combined properly in any one or more embodiments or examples.

The above description of the embodiments are to facilitate the understanding and application of ordinary skilled in the technical field. Those familiar with the field of the invention can easily make various modifications to these embodiments and apply the general principles explained here to other embodiments without creative labor.

What is claimed is:

1. A method for providing a wide range of Ultraviolet B (UVB) light sources, which is used for ensuring that the superimposed UVB irradiance of each lamp bead within a lamp equipped with multiple UVB lamp beads is relatively uniform, characterized by comprising the following steps:

Step I: simulating a single light source using optical simulation software for a lamp with multiple UVB lamp beads, selecting the angle of a UVB lens, appropriate band and optical power first, adjusting the distance between UVB lamp beads to ensure that the irradiance of UVB lamp beads is superimposed to a target range, and fine-tuning each lamp bead;

Step II: adopting an adjustment device equipped with a Blue White capacitive (BW-CAP) touch switch and an Ultraviolet Capacitive (UV-CAP) touch switch, setting up a Pulse Width Modulation (PWM) constant current control circuit with a corresponding number of channels according to the number of UVB to subdivide and digitize the irradiance, and obtain an accurate value to correspond to the corresponding UVB value;

Step III: using a UVB irradiance meter to perform real-time measurement on a test rig;

Step IV: calibrating the irradiance to the target UVB irradiance following a calibration program; the method adopted involves using the touch switches to adjust the values by incrementing or decrementing; pressing and holding the two touch switches at the same time, releasing them after the red light flashes once, calibrating the value of the first UVB lamp bead at the same time, clicking the UV-CAP touch switch for value decrement and the BW-CAP touch switch for value increment, touching the two touch switches simultaneously again after calibration, calibrating the value of the second UVB lamp bead after the red indicator flashes twice, and repeating the process until all UVB lamp beads are calibrated;

Step V: ensuring that the target UVB irradiance is achieved after calibration of all UVB lamp beads, so that the irradiation values of all lamp beads can be superimposed to obtain a uniform light source.

2. The method for providing a wide range of uniform UVB light sources according to claim 1, characterized in that the method for providing a wide range of uniform UVB light sources is used for individually adjusting the emission intensity of UVB lamp beads.

3. The method for providing a wide range of uniform UVB light sources according to claim 1, characterized in that the operation mode of the calibration program is as follows: lighting up the first UVB after starting the calibration program, using a UVB tester to test the value at a certain distance below the UVB lamp bead until it reaches the target value, then calibrating the value of the next UVB, and repeating the process until the last lamp bead is calibrated, so that each lamp bead maintains the consistent irradiance.

4. The method for providing a wide range of uniform UVB light sources according to claim 1, characterized in that the uniform coverage of UVB intensity can be maintained within a certain range when multiple UVB lamp beads work simultaneously.

5. The method for providing a wide range of uniform UVB light sources according to claim 1, characterized in that in step I, the data after fine tuning is stored for automatic call when the UVB work in the subsequent equipment work.

6. The method for providing a wide range of uniform UVB light sources according to claim 1, characterized in that the superimposed irradiance value is always between a standard upper limit and a standard lower limit.

7. The method for providing a wide range of uniform UVB light sources according to claim 1, characterized in that pin ends of a constant current Integrated Circuit (IC) module include Input Voltage (VIN), Current Sensing Negative (CSN), Switching Pin (SW), Ground (GND) and Dimming Pin (DIM).

8. A device adopted in the method for providing a wide range of uniform UVB light sources according to claim 1, characterized by comprising: A Shrink Small Outline Package-20 (SSOP20) microcontroller, wherein the 17th pin Blue Light-Emitting Diode (B-LED) and the 15th pin White Light Emitting Diode (W-LED) are respectively connected to a blue light PWM control output module and a white light PWM control output module in sequence; PWM constant current control circuits with several channels for subdividing and digitizing the irradiance, which is connected with the microcontroller, and each constant current control circuit includes a group of UVB light sources and a PT4115 constant-current IC module; Touch switches, comprising a BW-CAP touch switch and a UV-CAP touch switch connected with ports of the microcontroller, and used for performing the calibration program and adjusting UVB values.

9. The device adopted in the method for providing a wide range of uniform UVB light sources according to claim 8, characterized in that the circuit board of the microcontroller is connected to a program burning circuit module.

10. The device adopted in the method for providing a wide range of uniform UVB light sources according to claim 9, characterized in that each PWM control output module is equipped with an AO3400 transistor.

* * * * *